US007257116B2

(12) United States Patent
Poeluev et al.

(10) Patent No.: US 7,257,116 B2
(45) Date of Patent: Aug. 14, 2007

(54) DISABLING HEADER COMPRESSION OVER POINT-TO-POINT PROTOCOL (PPP)

(75) Inventors: Yuri Poeluev, Mississauga (CA); Ronald G. Mercer, Mississauga (CA)

(73) Assignee: Certicom Corp., Mississauga (CA)

( * ) Notice: Subject to any disclaimer, the term of this patent is extended or adjusted under 35 U.S.C. 154(b) by 766 days.

(21) Appl. No.: 09/918,646

(22) Filed: Aug. 1, 2001

(65) Prior Publication Data

US 2003/0026255 A1   Feb. 6, 2003

(51) Int. Cl.
    *H04L 12/28*   (2006.01)
(52) U.S. Cl. .................................... 370/389; 370/465
(58) Field of Classification Search ............... 370/352, 370/389, 392, 401, 465, 477, 521
    See application file for complete search history.

(56) References Cited

U.S. PATENT DOCUMENTS

| 5,535,199 | A | * | 7/1996 | Amri et al. .................. 370/392 |
| 5,742,773 | A | * | 4/1998 | Blomfield-Brown et al. .... 709/228 |
| 5,956,490 | A | * | 9/1999 | Buchholz et al. ........... 709/245 |
| 6,198,735 | B1 | * | 3/2001 | Pazhyannur et al. ........ 370/349 |
| 6,434,168 | B1 | * | 8/2002 | Kari ........................... 370/521 |
| 6,590,905 | B1 | * | 7/2003 | Suumaki et al. ............ 370/392 |
| 6,765,909 | B1 | * | 7/2004 | Sen et al. ................... 370/392 |
| 6,839,339 | B1 | * | 1/2005 | Chuah ........................ 370/349 |
| 6,839,413 | B1 | * | 1/2005 | Brock et al. ............. 379/93.08 |

OTHER PUBLICATIONS

Carlson, J., "PPP Design and Debugging," ISBN: 0201185393, Addison-Wesley, Dec. 1997.
Carlson, J., "PPP Design and Debugging," ISBN: 0201700530, Addison-Wesley, Jan. 2001.
Postel, J., "Internet Protocol Specification," RFC-791, USC/Information Sciences Institute, Sep. 1981.
Postel, J., "Transmission Control Protocol Specification," RFC-793, USC/Information Sciences Institute, Sep. 1981.
Jacobson, V., "Compressing TCP/IP Headers for Low-Speed Serial Links," RFC-1144, Lawrence Berkeley Laboratory, Feb. 1990.
McGregor, G., "The PPP Internet Protocol Control Protocol (IPCP)," RFC-1332, Merit Network Inc., May 1992.
Simpson, W., "The Point-to-Point Protocol (PPP)," RFC-1661, Daydreamer, Jul. 1994.
Simpson, W., "PPP in HDLC-like Framing," RFC-1662, Daydreamer, Jul. 1994.
Rand, D., "PPP Reliable Transmission," RFC-1663, Novell, Jul. 1994.
Carlson, J., "PPP Design and Debugging," ISBN: 0-201-18593-3, Addison-Wesley, Dec. 1997; pp. 26-29, 33-36, & 71-73.
Carlson, J., "PPP Design, Implementation, and Debugging," ISBN: 0-201-70053-0, Addison-Wesley, Jul. 2000, pp. 55-58, 61-63, 127-131.

* cited by examiner

*Primary Examiner*—Huy D. Vu
*Assistant Examiner*—Christine Ng
(74) *Attorney, Agent, or Firm*—John R. S. Orange; Brett J. Slaney; Blake, Cassels & Graydon LLP

(57) ABSTRACT

A method and system for manipulating packet header compression parameters, by substituting at least one instruction set associated with a PPP negotiation packet at the PPP layer of a protocol stack, the at least one instruction set for use in establishing a communication protocol and channel between a pair of correspondents. The method includes the steps of a software module coupled to a first correspondent examining all PPP negotiation packets from a second correspondent; the software module determining whether a first instruction set is present in the PPP negotiation packet; the software module discarding said first instruction set and replacing the first instruction set with a second instruction set; and at the second correspondent receiving the second instruction set associated with a communication protocol information.

14 Claims, 4 Drawing Sheets

```
 0           1           2           3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Type   |  Length  |    IP-Compression-Protocol    |
+-+-+-+-+-+-+-+-+-+-+-+-+-+-+-+-+-+-+-+-+-+-+-+-+-+-+-+-+-+-+-+-+
| Max-Slot-Id | Comp-Slot-Id |
+-+-+-+-+-+-+-+-+-+-+-+-+-+-+-+-+
```

Fig. 2

DISABLING HEADER COMPRESSION OVER POINT-TO-POINT PROTOCOL (PPP)

FIELD OF INVENTION

The present invention relates to communications networks, more particularly it relates to the processing of data packets within a protocol stack.

BACKGROUND OF THE INVENTION

Compressing protocol headers has traditionally been attractive for conserving bandwidth over low-speed links, including those in wireless systems, by minimizing header overheads. Typically, the header overhead associated with the protocol stacks used is prohibitive on low-bit rate links, where compression down to a few dozen bytes per real-time information packet is often desirable. Generally, data link header compression reduces the size of a header at the data link layer of the protocol stack, while network layer header compression reduces the size of the header at the network layer of the protocol stack. One of the known schemes is the Van Jacobson TCP/IP header compression algorithm, which reduces the size of the TCP/IP headers to as few as three bytes. This can be a significant improvement on slow serial lines, particularly for interactive traffic, especially between devices with substantially limited computing power or having reduced bandwidth. This form of TCP/IP header compression is described in RFC 1144 ("Compressing TCP/IP Headers for Low-Speed Serial Links"). The protocol describes a maximal compression algorithm that relies on knowledge of the fields in the TCP/IP headers and how they are likely to change from packet to packet The Van Jacobson compression of TCP/IP headers is usually negotiated during the establishment and configuration of the network layer protocol. However, on some operating systems, such as PALM® OS, it may not be feasible to intercept Internet protocol (IP) packets at the network layer, due to the system architecture.

However, this functionality can optionally be implemented in the Point-To-Point Protocol (PPP). This may be the case where a software module, such as a driver, is placed below the PPP layer to analyze or perform a certain operation on IP packets. One such operation may be implementation of IP Security Architecture (IPSec), which provides data confidentiality and authentication services to IP data packets. Therefore, the driver below the PPP layer needs to either examine or modify IP packets as they are passed to and from the PPP layer. However, since the driver cannot access the compression parameters inside the PPP layer, it is therefore is unable to translate compressed TCP/IP headers.

It is therefore an object of this invention to mitigate at least one of these disadvantages.

SUMMARY OF THE INVENTION

In one of its aspects, the present invention provides a method and a system for manipulating packet header compression parameters, by substituting at least one instruction set associated with a PPP negotiation packet in a network stack. The at least one instruction is used in establishing a communication channel between a pair of correspondents. The method includes the steps of:

(a) a software module at a PPP layer of a responding correspondent examining at least one PPP negotiation packet from an initiating correspondent;

(b) the software module determining whether a first instruction set is present in the PPP negotiation packet;
(c) the software module substituting the first instruction set with a second instruction set;
(d) at the initiating correspondent receiving the second instruction set and transmitting subsequent packets to the responding correspondent in accordance with the second instruction set.

BRIEF DESCRIPTION OF THE DRAWINGS

These and other features of the preferred embodiments of the inventor will become apparent in the following defined description in which reference is made to the appended drawings wherein:

FIG. 2 shows an example of an IP-Compression-Protocol configuration option format to negotiate Van Jacobson TCP/IP header compression;

DESCRIPTION OF THE INVENTION

Figure 1:
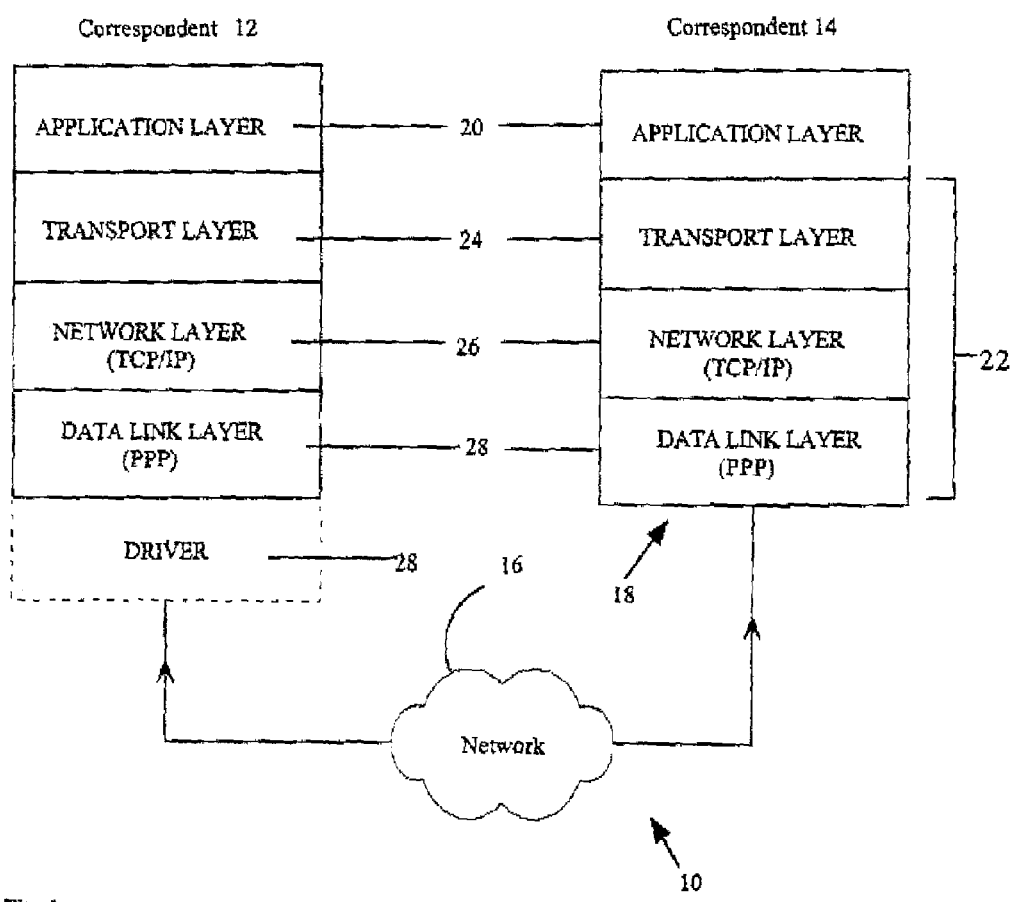
FIG. 1 shows overview of a system for facilitating a method for manipulating header information of IP packets.

Reference is first made to FIG. 1, which is an overview of a system for manipulating packet header compression parameters, shown generally by the numeral 10, in a preferred embodiment. This manipulation is achieved by substituting at least one instruction set associated with a PPP negotiation packet at the PPP layer of a protocol stack 18. The instruction set is used in establishing a communication channel 16 between a pair of correspondents 12 and 14. It will be appreciated by persons skilled in the art that the communication channel may be any network such as a local area network (LAN), a wide area network (WAN), the Internet or a wireless system using, for example, a wireless application protocol (WAP), may be used. The correspondents 12 and 14 are typically computing devices that are, but not limited to, personal computers, handheld devices, cell phones, pagers and microprocessor-based wireless information devices.

The correspondents 12 and 14 include a processing unit, computer readable medium including ROM, flash memory, non-volatile RAM, magnetic disk, optical disk, IC memory card or magnetic tape. Also, the correspondents 12 and 14 execute an operating system such as Microsoft® Windows 2000, Windows CE, UNIX, EPOC, Pocket® PC OS or PALM OS®.

In the preferred embodiment, the correspondents 12 and 14 are handheld devices such as Palm or Handspring Visor executing the PALM OS operating system, from Palm Inc, California, USA. Looking at FIG. 1, showing the network protocols in the PALM OS environment, the protocol stack 18 is based on the 7-layer OSI model. Thus the stack 18 includes an applications layer 20 for applications such as web browsers and other application programs, a network library 22 coupled to the applications layer via a network library application programming interface (API). The network library 22 includes a transport (TCP and UDP) layer 24, a network (IP) layer 26 and a data link (PPP and SLIP) layer 28 for negotiating a set of communication and configuration parameters. These layers 24, 26 and 28 are integrated to substantially optimize performance, such as speed and space, especially in a handheld environment. The protocol stack 18 and the application programs may be stored in the computer readable medium or may be embedded in the computer readable medium.

The Point-to-Point Protocol (PPP) provides a standard method of encapsulating Network Layer protocol information over point-to-point links. PPP also defines an extensible Link Control Protocol, and proposes a family of Network Control Protocols (NCPs) for establishing and configuring different network-layer protocols In order to establish compression of IP datagrams sent over a PPP link, each end of the link must agree on a set of configuration parameters for the compression. The process of negotiating link parameters for network layer protocols is handled in PPP by a family of network control protocols (NCPs). Typically, this is accomplished before any PPP link is established for data flow over that link.

As mentioned above, Van Jacobson TCP/IP header compression reduces the size of the TCP/IP headers to as few as three bytes. This can be a significant improvement on slow serial lines, particularly for interactive traffic. The Van Jacobson IP-Compression-Protocol Configuration Option is used to indicate the ability to receive compressed packets. Therefore, each of the correspondents 12 and 14 must separately request this option if bi-directional compression is desired. FIG. 2 shows an example of an IP-Compression-Protocol configuration option format to negotiate Van Jacobson TCP/IP header compression.

The PPP negotiation occurs prior to exchanging standard routing information and data traffic over PPP datalinks a order to establish the communication protocol and the channel, a compression option such as X, Y or Z, is negotiated by the pair of correspondents 12 and 14. Once an acceptable compression option type has been chosen, it is included in the Compression Request packet and the compression response packet. For example, the negotiation packets may include instruction sets associated with a plurality of options, such as, X, Y, or Z. Once PPP negotiations are completed, the IP packets are sent using the agreed upon compression options. If either correspondent 12 or 14 does not accept a compression option, then this compression option will not be used.

The Van Jacobson TCP/IP Header Compression negotiation is a series of negotiation packets exchanged between PPP correspondents 12 and 14 to negotiate a set of options and option values when sending data. Typically, the negotiation involves two separate dialogs between two correspondents 12 and 14. Generally, the dialog begins with correspondent 14 asking, negotiating, and then receiving confirmation of the compression options that are used when sending data to correspondent 12. This dialog starts with correspondent 14 sending a Compression-Request message and ends when correspondent 12 sends a Compression-Ack message. Similarly, correspondent 12 asks, negotiates, and then receives confirmation of the compression options that are used when sending data to correspondent 12. This dialog starts with correspondent 12 sending a Compression-Request message and ends when correspondent 14 sends a Compression-Ack message.

However, when correspondent 12 or 14 sends its initial Compression-Request, the response is any of the following: a Compression-Nack message because one or more options have unacceptable values, a Compression-Reject message because one or more of the options are unknown or not negotiable, or a Compression-Ack message because all of the options have acceptable values. Typically, when a correspondent 12 or 14 receives a Compression-Nack message or Compression-Reject message in response to its Compression-Request message, it sends a new Compression-Request message with modified options or option values. When a Compression-Ack message is received, the initiating correspondent 12 or 14 is ready to send data.

However, as shown in FIG. 1, in the preferred embodiment at least one of the correspondents 12 and 14 includes a software module 30 placed at the PPP layer of the protocol stack 18. The software module 30 is used to intercept data packets up and down the protocol stack 18 in order to examine or modify the IP packets. Such modification may include implementation of IP Security Architecture (IPSec), which provides data confidentiality and authentication services to IP data packets. The software module 30 may be implemented as a driver. The negotiation process for between a pair of correspondents 12 and 14 will now be described with reference to FIG. 3. By way of example, the process starts off with step 100, in which correspondent 14 sends a Compression-Request message requesting a compression option X for the TCP/IP header; and upon receiving the Compression Request, the driver 30 sends 102 a Compression-Reject message since the option type X is not negotiable. Similarly, should the PPP layer of correspondent 12 send a new Compression-Request message in step 104, the driver 30 intercepts that Compression-Request message 106 and sends a Compression-Reject message back to the PPP layer of correspondent 12.

Therefore each time the correspondent 14 sends a new Compression-Request message, the driver 30 issues a Compression-Reject message, thus effectively disabling the Van Jacobson TCP/IP header compression.

Figure 3:
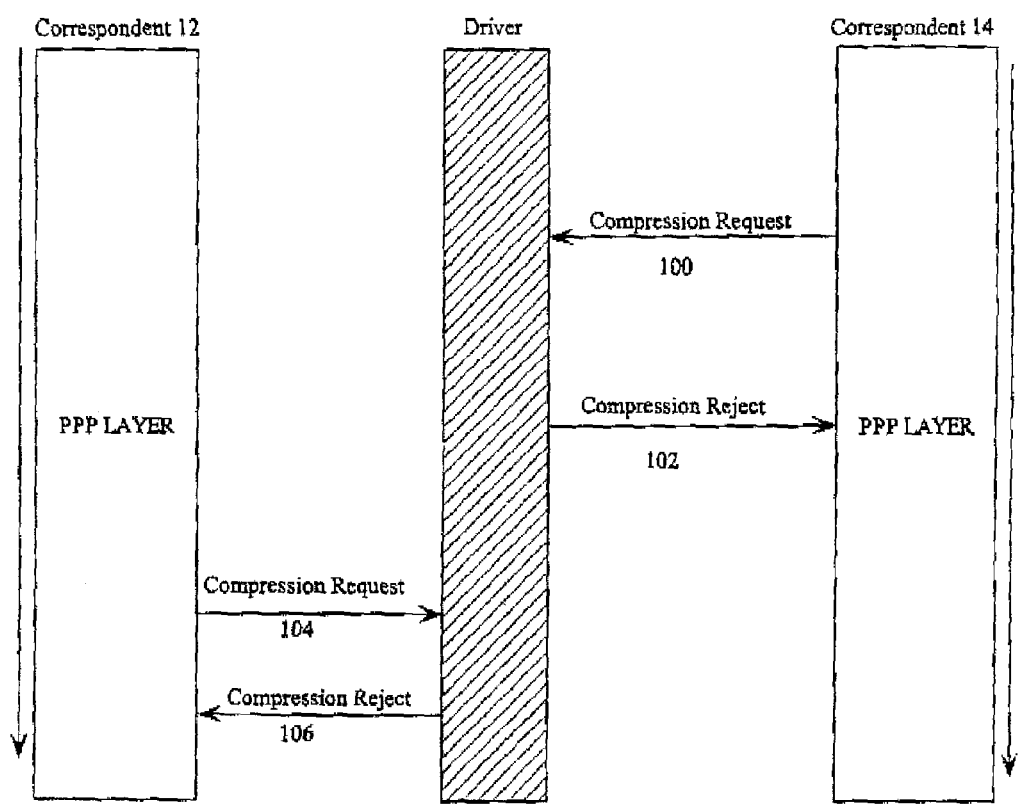
FIG. 3 shows a negotiation process between a pair of correspondents, with at least on of the correspondents having a software module for manipulating instruction sets associated in establishing a communication channel between the correspondents.
Figure 4:
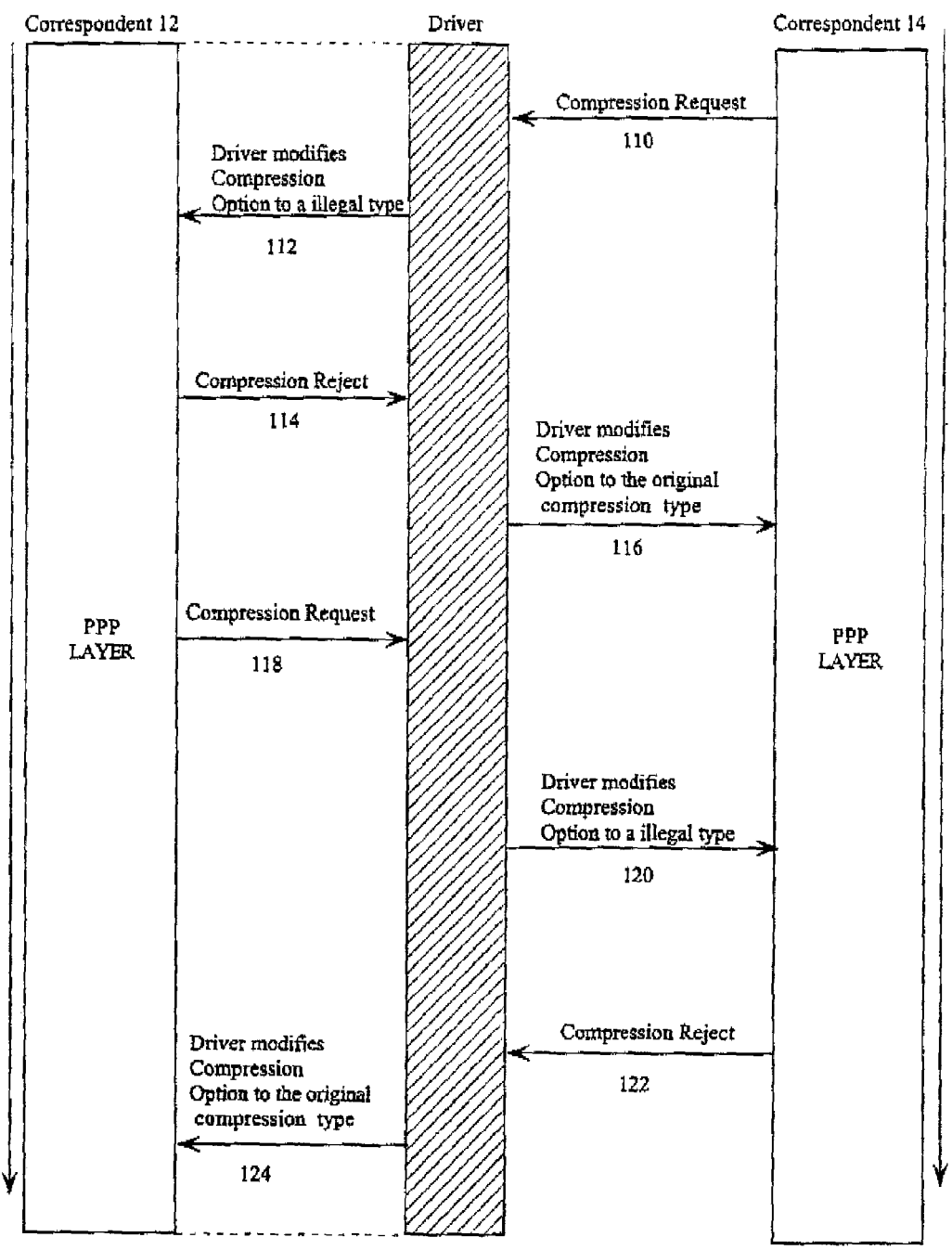
FIG. 4 shows a negotiation process between a pair of correspondents, with at least on of the correspondents having a software module for manipulating instruction sets associated in establishing a communication channel between the correspondents, in another embodiment.

In another embodiment, the method of disabling Van Jacobson TCP/IP header compression by manipulating the header compression parameters is described as shown in FIG. 3. This method is especially useful in instances where the driver 30 cannot send packets in the direction opposite to the direction, in which the packet was received while the driver 30 is processing packets. From the PPP layer of the remote correspondent 14 sends a Compression-Request message in step 110, the driver 30 modifies the acceptable compression option type X to an unacceptable type A and passes 112 the modified Compression-Request packet up to the PPP layer of Correspondent 12. The PPP layer of correspondent 12 rejects 114 this illegal type as being unacceptable and sends it back to the driver 30 as a Compression Reject packet. In step 116, the driver 30 intercepts the Compression Reject packet and modifies the unacceptable option type, such as option type A, back to the original compression option type X and sends it to the correspondent 14. Similarly, when the driver 30 intercepts 118 a Compression Request packet sent by a PPP layer of correspondent 12 to the correspondent 14, the driver 30 modifies 120 the compression option type to an unacceptable option type A and sends the packet to the correspondent 14. Since the option type is not acceptable, the correspondent 14 responds 122 with a Compression Reject message, and the driver 30 modifies 124 the unacceptable option type A back to the original compression type X and sends it to the PPP layer of the correspondent 12.

Therefore each time the correspondent 14 sends a new Compression-Request message, the driver 30 issues a Compression-Reject message, thus effectively disabling the Van Jacobson TCP/IP header compression.

The above-described embodiments of the invention are intended to be examples of the present invention and alterations and modifications may be effected thereto, by those of skill in the art without departing from the scope of the invention which is defined solely by the claims appended hereto.

The embodiments of the invention in which an exclusive property or privilege is claimed are defined as follows:

1. A method for disabling header compression of TCP/IP headers during an establishment and configuration of a communication protocol and communication channel between an initiating correspondent and a responding correspondent, said method including the steps of:
   an initiating correspondent transmitting at least one PPP negotiation packet having at least one acceptable TCP/IP header compression option type, said option type being associated with a first instruction set for said establishment and configuration of said communication protocol and channel;
   a software module coupled to said responding correspondent intercepting and examining said at least one PPP compression request packet before said at least one PPP compression request packet reaches said responding correspondent's PPP layer;
   said software module modifying said acceptable option type to an unacceptable option type and transmitting said modified PPP negotiation packet to said responding correspondent's PPP layer;
   said responding correspondent's PPP layer receiving said modified PPP negotiation packet and rejecting said unacceptable option type;
   said software module receiving said PPP negotiation packet having said unacceptable option type; and
   said software module modifying said unacceptable option type to said acceptable type and transmitting said PPP negotiation packet to said initiating correspondent.

2. A method according to claim 1 wherein said header compression is implemented by a Van Jacobson compression algorithm.

3. A method according to claim 1 wherein said communication channel is any one of a local area network (LAN), a wide area network (WAN), the Internet, and a wireless system using a wireless application protocol (WAP).

4. A method according to claim 1 wherein at least one of said initiating correspondent and said responding correspondent is a handheld device.

5. A method according to claim 1 wherein said PPP layer is part of a network protocol stack.

6. A method according to claim 5 wherein said protocol stack is based on a 7-layer open systems interconnection (OSI) model.

7. A method according to claim 1 wherein said software module is implemented as a driver.

8. A method for disabling header compression of TCP/IP headers during an establishment and configuration of a communication protocol and communication channel between an initiating correspondent and a responding correspondent, said method including the steps of:
   an initiating correspondent transmitting at least one PPP negotiation packet having at least one acceptable TCP/IP header compression option type, said option type being associated with a first instruction set for said establishment and configuration of said communication protocol and channel;
   a software module coupled to said initiating correspondent's PPP layer for intercepting and examining said at least one PPP compression request packet before said at least one PPP compression request packet is transmitted to said responding correspondent, said software module modifying said acceptable option type to an unacceptable option type and transmitting said modified PPP negotiation packet to said responding correspondent's PPP layer;
   said responding correspondent's PPP layer receiving said modified PPP negotiation packet and rejecting said unacceptable option type;
   said software module receiving said PPP negotiation packet having said unacceptable option type; and
   said software module modifying said unacceptable option type to said acceptable type and transmitting said PPP negotiation packet to said initiating correspondent's PPP layer.

9. A method according to claim 8 wherein said header compression is implemented by a Van Jacobson compression algorithm.

10. A method according to claim 8 wherein said communication channel is any one of a local area network (LAN), a wide area network (WAN), the Internet, and a wireless system using a wireless application protocol (WAP).

11. A method according to claim 8 wherein at least one of said initiating correspondent and said responding correspondent is a handheld device.

12. A method according to claim 8 wherein said PPP layer is part of a network protocol stack.

13. A method according to claim 12 wherein said protocol stack is based on a 7-layer open systems interconnection (OSI) model.

14. A method according to claim 8 wherein said software module is implemented as a driver.

* * * * *